(12) United States Patent
McKeeman et al.

(10) Patent No.: US 10,135,908 B1
(45) Date of Patent: *Nov. 20, 2018

(54) SYSTEM AND METHOD FOR UPLOADING FILES TO SERVERS UTILIZING GPS ROUTING

(71) Applicant: Utility Associates, Inc., Decatur, GA (US)

(72) Inventors: Robert S McKeeman, St. Pete Beach, FL (US); Simon Araya, Atlanta, GA (US); Ted M. Davis, Decatur, GA (US)

(73) Assignee: Utility Associates, Inc., Decatur, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,464

(22) Filed: Jul. 29, 2016

Related U.S. Application Data

(63) Continuation of application No. 13/605,240, filed on Sep. 6, 2012, now Pat. No. 9,432,402.

(60) Provisional application No. 61/531,261, filed on Sep. 6, 2011.

(51) Int. Cl.
| | |
|---|---|
| *H04L 29/08* | (2006.01) |
| *H04W 4/021* | (2018.01) |
| *G06F 17/30* | (2006.01) |
| *G06F 21/64* | (2013.01) |
| *H04W 88/02* | (2009.01) |

(52) U.S. Cl.
CPC ........ *H04L 67/06* (2013.01); *G06F 17/30091* (2013.01); *G06F 17/30203* (2013.01); *G06F 21/64* (2013.01); *H04L 67/1097* (2013.01); *H04W 4/021* (2013.01); *H04W 88/02* (2013.01)

(58) Field of Classification Search
CPC ...................................................... H04L 67/06
See application file for complete search history.

(56) References Cited

U.S. PATENT DOCUMENTS

| | | | |
|---|---|---|---|
| 6,260,040 B1 * | 7/2001 | Kauffman | ......... G06F 17/30067 |
| 6,580,700 B1 | 6/2003 | Pinard et al. | |
| 6,895,235 B2 | 5/2005 | Padgett et al. | |
| 7,065,526 B2 | 6/2006 | Wissner et al. | |
| 7,173,918 B2 | 2/2007 | Awater et al. | |
| 7,177,649 B1 | 2/2007 | Nielsen | |
| 7,522,906 B2 * | 4/2009 | Whelan | .................. H04L 29/06 455/410 |
| 7,761,591 B2 * | 7/2010 | Graham | ................ G06Q 40/02 709/204 |
| 7,907,562 B2 | 3/2011 | Murty et al. | |
| 7,912,022 B2 | 3/2011 | Kostic et al. | |
| 7,929,973 B2 | 4/2011 | Zavalkovsky et al. | |
| 7,940,731 B2 | 5/2011 | Gao et al. | |
| 7,940,735 B2 | 5/2011 | Kozisek et al. | |
| 7,941,538 B2 | 5/2011 | Murphy et al. | |
| 7,952,996 B2 | 5/2011 | Olariu et al. | |
| 7,965,686 B1 | 6/2011 | Bridge et al. | |
| 7,966,564 B2 | 6/2011 | Catlin et al. | |
| 7,983,163 B2 | 7/2011 | Denecheau et al. | |
| 7,987,268 B2 | 7/2011 | Chen et al. | |

(Continued)

*Primary Examiner* — Parth Patel
(74) *Attorney, Agent, or Firm* — Smith Gambrell & Russell LLP; Matthew P. Warenzak; Dale Lischer

(57) ABSTRACT

This invention provides a system and a method to manage the uploading of data files from multiple wireless field devices in multiple locations to multiple data storage servers through the use of location information.

6 Claims, 10 Drawing Sheets

(56) References Cited

U.S. PATENT DOCUMENTS

| | | | |
|---|---|---|---|
| 7,991,403 B2 | 8/2011 | Lee et al. | |
| 8,332,544 B1* | 12/2012 | Rails | A63F 13/92 |
| | | | 340/573.1 |
| 8,336,029 B1* | 12/2012 | McFadden | G06F 9/45516 |
| | | | 717/100 |
| 8,363,102 B1 | 1/2013 | Kadoch et al. | |
| 8,374,622 B2 | 2/2013 | Trudeau | |
| 8,781,475 B1 | 7/2014 | McKeeman et al. | |
| 8,955,141 B2* | 2/2015 | Ji | G06F 21/10 |
| | | | 726/26 |
| 8,997,092 B2* | 3/2015 | Gentile | H04L 43/065 |
| | | | 717/177 |
| 9,232,491 B2* | 1/2016 | Mahaffey | H04L 41/0253 |
| 9,319,879 B2* | 4/2016 | Achtari | G06F 15/16 |
| 9,432,402 B1* | 8/2016 | McKeeman | H04L 63/20 |
| 2002/0059440 A1* | 5/2002 | Hudson | G06F 17/30902 |
| | | | 709/231 |
| 2002/0143798 A1 | 10/2002 | Lisiecki et al. | |
| 2002/0156578 A1* | 10/2002 | Kondou | G01S 5/0027 |
| | | | 701/516 |
| 2003/0046586 A1 | 3/2003 | Bheemarasetti et al. | |
| 2004/0009778 A1* | 1/2004 | Makuta | H04L 63/107 |
| | | | 455/456.1 |
| 2004/0053624 A1 | 3/2004 | Frank et al. | |
| 2004/0139103 A1* | 7/2004 | Boyce | G06K 9/00127 |
| 2005/0100329 A1* | 5/2005 | Lao | G08B 13/19647 |
| | | | 386/216 |
| 2005/0114711 A1 | 5/2005 | Hesselink et al. | |
| 2005/0157856 A1* | 7/2005 | Humphries | H04L 12/66 |
| | | | 379/88.17 |
| 2005/0198194 A1 | 9/2005 | Burkey | |
| 2006/0090069 A1* | 4/2006 | Burokas | G06F 9/4416 |
| | | | 713/163 |
| 2006/0174017 A1 | 8/2006 | Robertson | |
| 2007/0032225 A1* | 2/2007 | Konicek | H04M 1/72513 |
| | | | 455/417 |
| 2007/0069030 A1* | 3/2007 | Sauerwein, Jr. | G06Q 10/083 |
| | | | 235/462.46 |
| 2007/0130023 A1 | 6/2007 | Wolinsky et al. | |
| 2008/0021730 A1 | 1/2008 | Holla et al. | |
| 2008/0090595 A1* | 4/2008 | Liu | H04L 63/102 |
| | | | 455/461 |
| 2008/0104242 A1* | 5/2008 | Zavalkovsky | H04L 63/20 |
| | | | 709/225 |
| 2008/0109317 A1* | 5/2008 | Singh | G06Q 30/02 |
| | | | 705/14.5 |
| 2008/0214300 A1* | 9/2008 | Williams | G06F 21/125 |
| | | | 463/29 |
| 2009/0199268 A1* | 8/2009 | Ahmavaara | H04L 12/4633 |
| | | | 726/1 |
| 2009/0210516 A1 | 8/2009 | Roskowski | |
| 2009/0309726 A1* | 12/2009 | Fritchie | G06F 19/3412 |
| | | | 340/568.1 |
| 2010/0054148 A1* | 3/2010 | Murakami | H04M 7/0027 |
| | | | 370/252 |
| 2010/0081417 A1 | 4/2010 | Hickie | |
| 2010/0151905 A1 | 6/2010 | Inlow | |
| 2010/0190474 A1 | 7/2010 | Rajguru | |
| 2010/0198905 A1 | 8/2010 | McKay et al. | |
| 2010/0210280 A1* | 8/2010 | Haynes | G01S 5/0205 |
| | | | 455/456.1 |
| 2010/0250488 A1 | 9/2010 | Mayer et al. | |
| 2011/0012782 A1* | 1/2011 | Lee | G01S 5/0027 |
| | | | 342/357.25 |
| 2011/0039513 A1* | 2/2011 | Carlstrom | G08B 25/08 |
| | | | 455/404.1 |
| 2011/0053572 A1* | 3/2011 | Cook | H04M 1/72577 |
| | | | 455/414.2 |
| 2011/0115930 A1* | 5/2011 | Kulinets | H04N 1/00132 |
| | | | 348/211.2 |
| 2011/0306326 A1* | 12/2011 | Reed | H04L 67/1097 |
| | | | 455/414.1 |
| 2012/0046040 A1* | 2/2012 | Chatterjee | H04W 24/10 |
| | | | 455/456.1 |
| 2012/0047143 A1 | 2/2012 | Petersen et al. | |
| 2012/0142368 A1* | 6/2012 | Hjelm | H04W 4/001 |
| | | | 455/456.1 |
| 2012/0192239 A1 | 7/2012 | Harwell et al. | |
| 2012/0196615 A1* | 8/2012 | Edge | G01S 5/0036 |
| | | | 455/456.1 |
| 2012/0203877 A1* | 8/2012 | Bartholomay | H04L 63/0227 |
| | | | 709/221 |
| 2013/0010958 A1* | 1/2013 | Yao | H04L 63/102 |
| | | | 380/270 |
| 2014/0310243 A1* | 10/2014 | McGee | G06F 17/30575 |
| | | | 707/639 |

\* cited by examiner

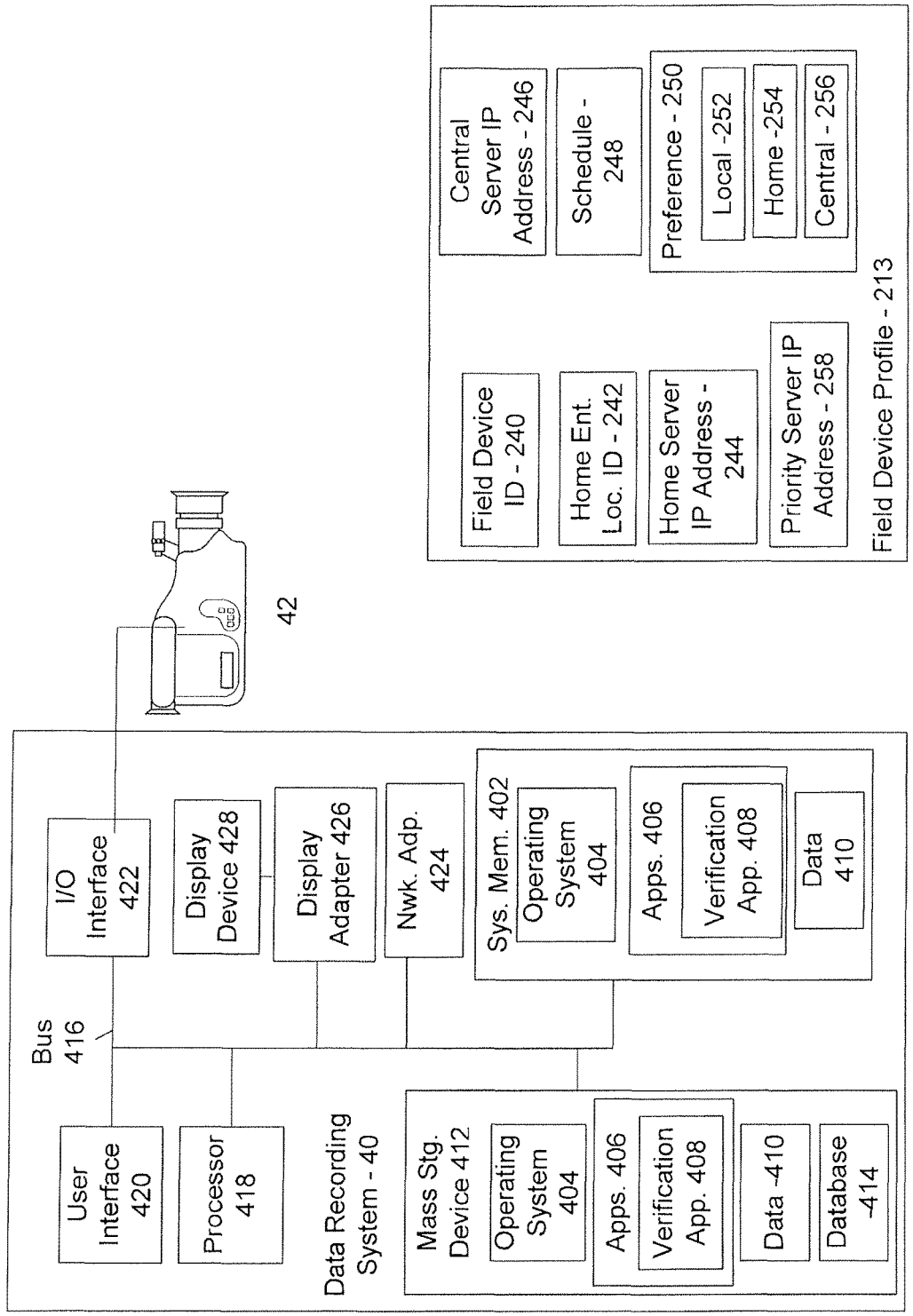

SYSTEM AND METHOD FOR UPLOADING FILES TO SERVERS UTILIZING GPS ROUTING

CLAIM OF PRIORITY

This application is a continuation of U.S. patent application Ser. No. 13/605,240, filed on Sep. 6, 2012, currently allowed, which claims priority from U.S. Provisional Patent Application No. 61/531,261 filed on Sep. 6, 2011, each of which is relied upon and incorporated herein in its entirety by reference.

BACKGROUND OF THE INVENTION

Technical Field

The present invention is in the technical field of wireless data communications. More particularly, the present invention is in the field of managing the uploading of data files from multiple mobile wireless field devices to localized data storage servers utilizing IP addresses and GPS routing capabilities.

Related Art

First responders (police, fire fighters, EMS, etc.) and other in-the-field operation enterprises are collecting an increasing volume of data related to their respective field operations. For example, the capture of video by video cameras in police vehicles during traffic stops, DUI stops, and other law enforcement business operations is increasing as well. The video-captured evidence from these field operations is a critical component for investigations, criminal and civil, requiring an audit trail of responsibility. As a result, organizations utilizing video data need a way to securely and quickly upload the captured data from the data-capturing devices associated with the field operation vehicles to a centralized enterprise server while maintaining the proper chain of custody.

Early in-the-field video systems recorded data via VHS tape, DVD discs, memory cards and the like. Receiving, cataloging, storing, and retrieving the captured data in these formats at physical evidence rooms, while maintaining proper chain of custody documentation, is expensive. Further, the process is slow and prone to errors and losses; inevitably some VHS tapes, DVDs, and/or memory cards are lost or damaged. As a result, in-the-field operation enterprises are moving to vehicle data capturing systems with a wireless capability so that data is transmitted wirelessly with a defensible chain of custody directly, eliminating the need for manual handling of evidence media such as VHS tapes, DVDs, and memory cards.

However, captured data files may be large, especially for video data files. For example, one hour of high-resolution video recorded at thirty frames per second creates a video data file of approximately 1 gigabyte. Police utilizing video recording systems record on average two (2) hours of video in an eight (8) hour shift, resulting in two gigabytes of video data that needs to be uploaded at the end of the shift to the enterprise storage server. Such a volume is much too large to be uploaded on a real-time basis over a cellular or satellite data connection established by the wireless field devices linked to the data recording systems. While cellular wireless data continues to get faster, particularly with 4G LTE, the bandwidth speed is still relatively slow compared to Wi-Fi and other 802.11 wireless connections. In addition, the cost to upload that much data over the cellular network would be prohibitive. Further, satellite based data upload is generally much slower and more expensive than cellular, so satellite data uploads are even less practical. As a result, the captured data is retained on the data storage portion of the data recording system within the in-the-field operations vehicle until the data can be wirelessly uploaded over Wi-Fi or other faster wireless point-to-point communication methods after a shift.

The uploading of the video data and other recorded information is generally done at locations associated with the enterprises, such as police station parking lots, jail or prison sally ports, fueling stations, fire stations, vehicle repair garages, and other enterprise facility locations. Such enterprises generally have several locations spread throughout a given area. In these instances, the vehicle housing the video capture equipment may only be within these secured locations temporarily. The vehicle may be at the enterprise location for business reasons including, but not limited to, dropping off a prisoner at the jail, refueling the vehicle, or returning to the police station parking lot at the end of the shift until the vehicle is needed for following shifts. Therefore the data upload process needs to be as fast as possible, so that the in-the-field operation vehicles, including first responders, can get back in the field, as opposed to waiting for a slow data upload process to be completed. Other organizations with a large in-the-field workforce and vehicle fleet have a similar business need to get field data uploaded quickly and reliably.

Wireless field devices connected to the data recording systems, such as laptop computers and vehicle wireless routers, have incorporated Wi-Fi 802.11b/g/n/ac wireless communications capability for some time, and are highly effective over small distances, such as 100 to 200 meters, rather than communications of Wide Area Networks between geographically separated upload points, like enterprise locations, that could be many miles apart. Because short range wireless communications is often faster than long range Wide Area Network communications, in many cases organizations have set up local file servers at wireless access points at there various locations to quickly receive and temporarily store large data files, particularly video data files, so that enterprise vehicles can get back into the field more quickly.

However, the data recording systems often do not have the ability to determine or store the name or IP address of more than one video server. The enterprise will often have multiple video servers with different IP addresses at different enterprise locations. Therefore, there is a need for a system that can automatically determine the location of the multiple video servers and route the upload of data files based upon the location of the wireless field devices in relation to the multiple video servers. Further, there is need for a system to perform such a function while maintaining the proper chain of custody.

SUMMARY OF INVENTION

The present invention is a system and method for managing the uploading of data files from wireless field devices wirelessly to data storage servers based upon the location of the wireless field devices. The system and method may utilize location information, such as information provided by GPS satellites, relating to the wireless field device to determine to which to data storage server to send the data files. The system and method may utilize wireless access points connected to the data storage servers. The wireless field devices may also utilize data recording systems to provide the data files.

In one embodiment of the present invention, the system may identify the local data storage server associated with the enterprise location in which a wireless field device is located and upload the data files to the local data storage server quickly. In other embodiments of the present invention, the system may have a preferred data storage server to which data files are preferably sent unless the system determines that uploading to such a server will take too much time.

In addition, the system must continue to calculate and maintain a reliable chain of custody over each data file being uploaded, so that the evidence value of the file is not compromised.

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

FIG. 4 is a block diagram of a wireless field device profile of a wireless field device according to an embodiment.

FIG. 5 is a block diagram of a data recording system of the file uploading management system of FIG. 1 according to an embodiment.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
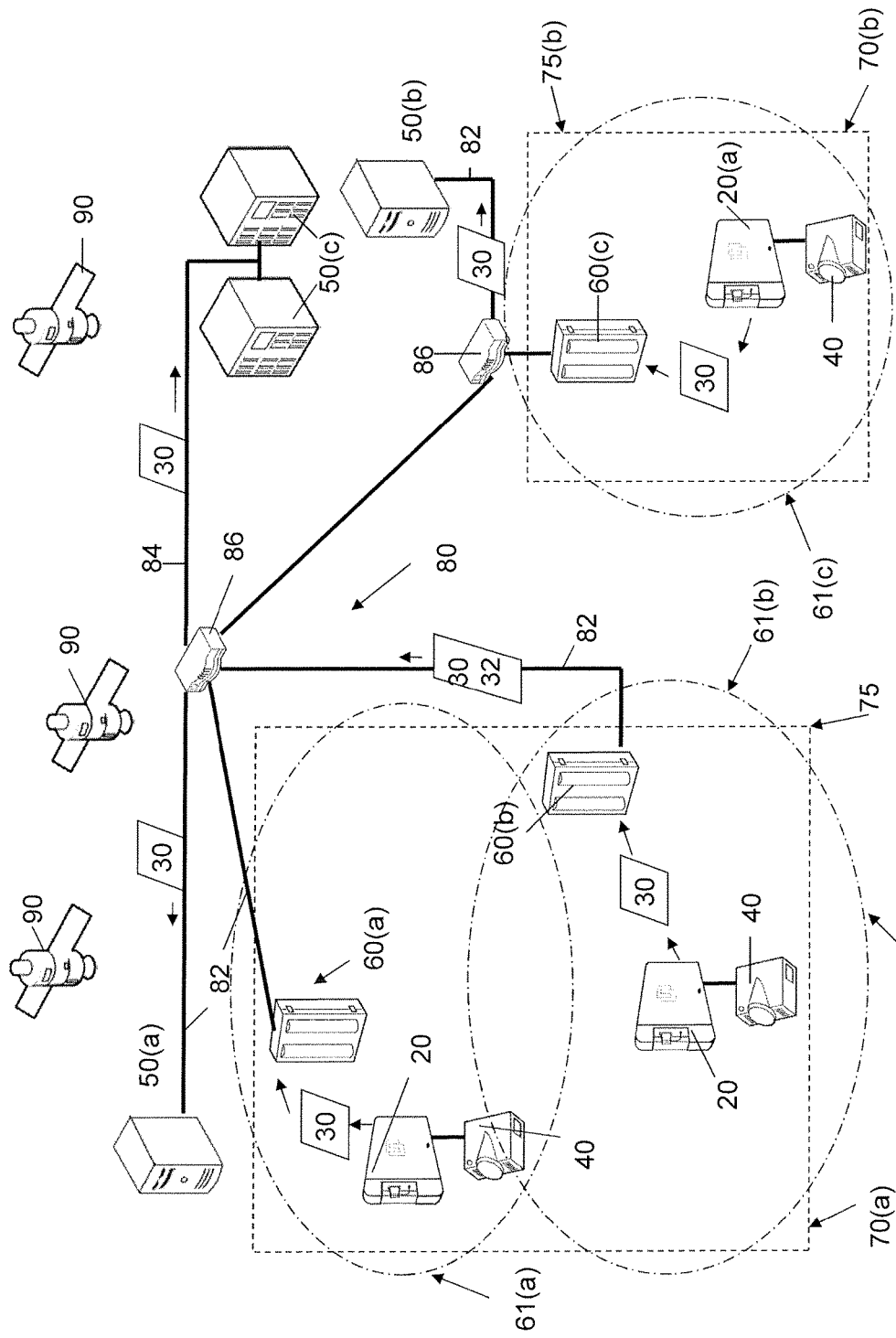
FIG. 1 is a schematic view of a file uploading management system according to an embodiment.

Referring to FIG. 1, the present invention is directed to a file uploading management system 10. The file uploading management system 10 includes wireless field devices 20 that are configured to send data files 30 from data recording systems 40 to data storage servers 50. The wireless field devices 20 are configured to send the data files 40 to the data storage servers 50 through wireless access points 60 associated within an enterprise location 70. The wireless access points 60 may utilize a network 80 to send the data files 30 to the data storage servers 50 at the direction of the wireless field devices 20. The wireless field devices 20 may utilize GPS satellites 90 and other components to determine at which enterprise location 70 the wireless field device 20 is located. The wireless field device 20 may determine the data storage server 50 to which to send the data files 30 based upon the enterprise location 70 in which the wireless field device 20 is located.

The file uploading management system 10 may be configured to be used with first responders and other in-the-field operation enterprises, as discussed above. In order to provide a clear understanding of the present invention, the system 10 will be explained in terms of use with a police department. However, all descriptions utilizing a police department are examples only and in no way limit the application of this invention.

As shown in FIG. 1, the file uploading management system 10 includes at least one wireless field device 20. Examples of the wireless field devices 20 utilized by the wireless file uploading management system 10 include, but are not limited to, laptop computers, wireless routers, wireless vehicle routers (e.g., Utility Associates Rocket™, Sierra Wireless GX440, and wireless vehicle routers by InMotion and BlueTree), tablets, smart phones, PDA's, hand held computers, and the like. In some embodiments of the present invention, the wireless field devices 20 also are configured to connect to data recording devices 40, discussed in more detail below. In addition, it is preferable that the wireless field device 20 is configured to operate in mobile and stationary instances. For example, the wireless field device 20 may be permanently mounted in a field vehicle, such as a police patrol car, utilized by in-the-field operation enterprises, and must be able to perform the functions described below while the field vehicle is in motion and stationary.

Figure 2:
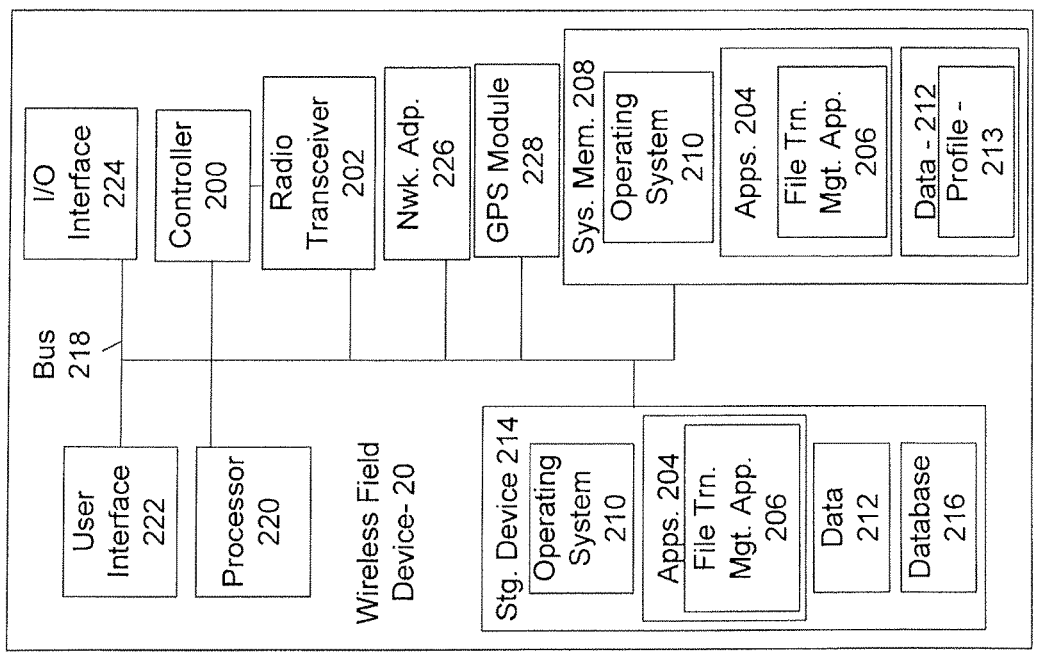
FIG. 2 is a block diagram of a wireless field device of the file uploading management system of FIG. 1 according to an embodiment.

Referring to FIG. 2, the wireless field device 20 includes a wireless interface controller ("controller") 200. The wireless interface controller 200 is configured to control the operation of a radio transceiver 202, including the connections of the radio transceiver 202. The wireless interface controller 200 and the radio transceiver 202 are configured to receive and send multiple signals and data at the same time. For example, the radio transceiver 202 can receive messages from the wireless access points 60 while uploading data files 30 to the wireless access points 60.

The radio transceiver 202 may communicate on a wide range of public frequencies, including, but not limited to, frequency bands 2.4 GHz and/or 5 GHz-5.8 GHz. In addition, the radio transceiver 202, with the assistance of the wireless interface controller 200, may also utilize a variety of public protocols. For example, in some embodiments of the present invention, the combination wireless interface controller 200 and radio transceiver 202 may operate on various existing and proposed IEEE wireless protocols, including, but not limited to, IEEE 802.11b/g/n/a/ac, with maximum theoretical data transfer rates/throughputs of 11 Mbps/54 Mbps/600 Mbps/54 MBps/1 GBps, respectively. However, in real world applications, the maximum theoretical data transfer rate for wireless field devices 20 employing such protocols is greatly affected by interference/collisions from other devices using the same protocols.

It is preferable that the radio transceiver 202 operates on the 5-5.8 GHz frequency band to maximize the transfer rate of the data file 30, which is generally the less crowded of the two frequency bands. By using the generally less crowded 5-5.8 GHz frequency band, the impact that other 5-5.8 GHz wireless devices will have on the maximum throughput of the radio transceiver 202 will be diminished. Likewise, it is preferable for the wireless field device 20 to utilize IEEE 802.11a, which is associated with 5-5.8 GHz bands, 802.11n, which supports faster uploading of data through a more sophisticated encoding algorithm, or 802.11ac.

The radio transceiver 202, with the assistance of the wireless interface controller 200, can also transmit and receive encrypted transmissions. In addition, the radio transceiver 202 may perform multi-channel bonding in order to maximize the potential wireless throughput capacity of the wireless access point 20. The combination wireless interface controller 200 and radio transceiver 202 may communicate on a public wireless network or a private/secured wireless network.

The wireless field device 20 is further configured to utilize the wireless interface controller 200 and radio transceiver 202 to transfer data files 30. The wireless field devices 20 will transmit the data file 30 as data packets through various known practices in the art. The protocol utilized by the wireless field device 20 will dictate the form and structure of the packets that form the data files 30. The data packets include the destination address and needed identification and sequencing information in order to reassemble the data packets into the data files 30 once the data packets have arrived at their temporary or final destination (i.e., the data storage server 50). The wireless field devices 20 can transfer more than one data file 30 at a time. The wireless interface controller 200 and the radio transceiver 202 of the wireless field device 20 are configured to send and receive data at the same time.

In some embodiments of the present invention, the wireless field device 20 utilizes a minimum radio signal strength indicator or threshold (RSSI/RSST) to limit communication to wireless access points 60 having a certain signal strength. The RSST may be set by a system administrator and stored on various components of the wireless field device 20, including, but not limited to, the system memory 208 or storage device 214. The RSST determination may be performed by the wireless interface controller 200 as the radio transceiver 202 receives signal strength information from the wireless access point 60.

The wireless field devices 20 may have one or more software applications 204, including a file transfer management application ("File Trn. Mgt. App.") 206. The file transfer management application 206 monitors and controls the transfer of data files 30 from the wireless field device 20 to the various data storage servers 50 and wireless access points 60, discussed in more detail below. The wireless field devices 20 includes system memory 208, which can store the various applications 204, including, but not limited to, the operating system 210 of the wireless field device 20 and the file transfer management application 206. The system memory 208 may also include data 212 accessible by the various software applications. The data 212 may include a field device profile 213, discussed in more detail below. The system memory 208 can include random access memory (RAM) or read only memory (ROM). Data 212 stored on the wireless field device 20 may be any type of retrievable data. The data may be stored in a wide variety of databases, including relational databases, including, but not limited to, Microsoft Access and SQL Server, MySQL, INGRES, DB2, INFORMIX, Oracle, PostgreSQL, Sybase 11, Linux data storage means, and the like.

The wireless field device 20 can include a variety of other computer readable media, including a storage device 214. The storage device 214 can be used for storing computer code, computer readable instructions, program modules, and other data for the wireless field device 20. The storage device 214 can be used to back up or alternatively to run the operating system 210 and/or other applications 204, including the file transfer management application 206. The storage device 214 may include a hard disk, various magnetic storage devices such as magnetic cassettes or disks, solid-state flash drives, CD-ROM, DVDs or other optical storage, random access memories, and the like.

As shown in FIG. 1, geo-fence polygons 75 are associated with the enterprise locations 70. The geo-fence polygons 75 are virtual perimeters to represent the real-world geographic area or boundaries of areas of the enterprise location 70. For example, in the case of a police station parking lot 70, the geo-fence polygon 75 would correlate with the borders of the parking lot 70. The geo-fence polygon 75 includes the known coordinates (e.g., longitude and latitude of area) of a particular boundary for each enterprise location 70. It is preferred that the geo-fence polygons 75 be defined as precisely as possible to the particular boundaries of the enterprise locations 70 in order to ensure that the transfer of data files 30 occurs only within the enterprise location 70, and not when the wireless field device 20 is adjacent to, but not within, the enterprise location 70.

Figure 3:
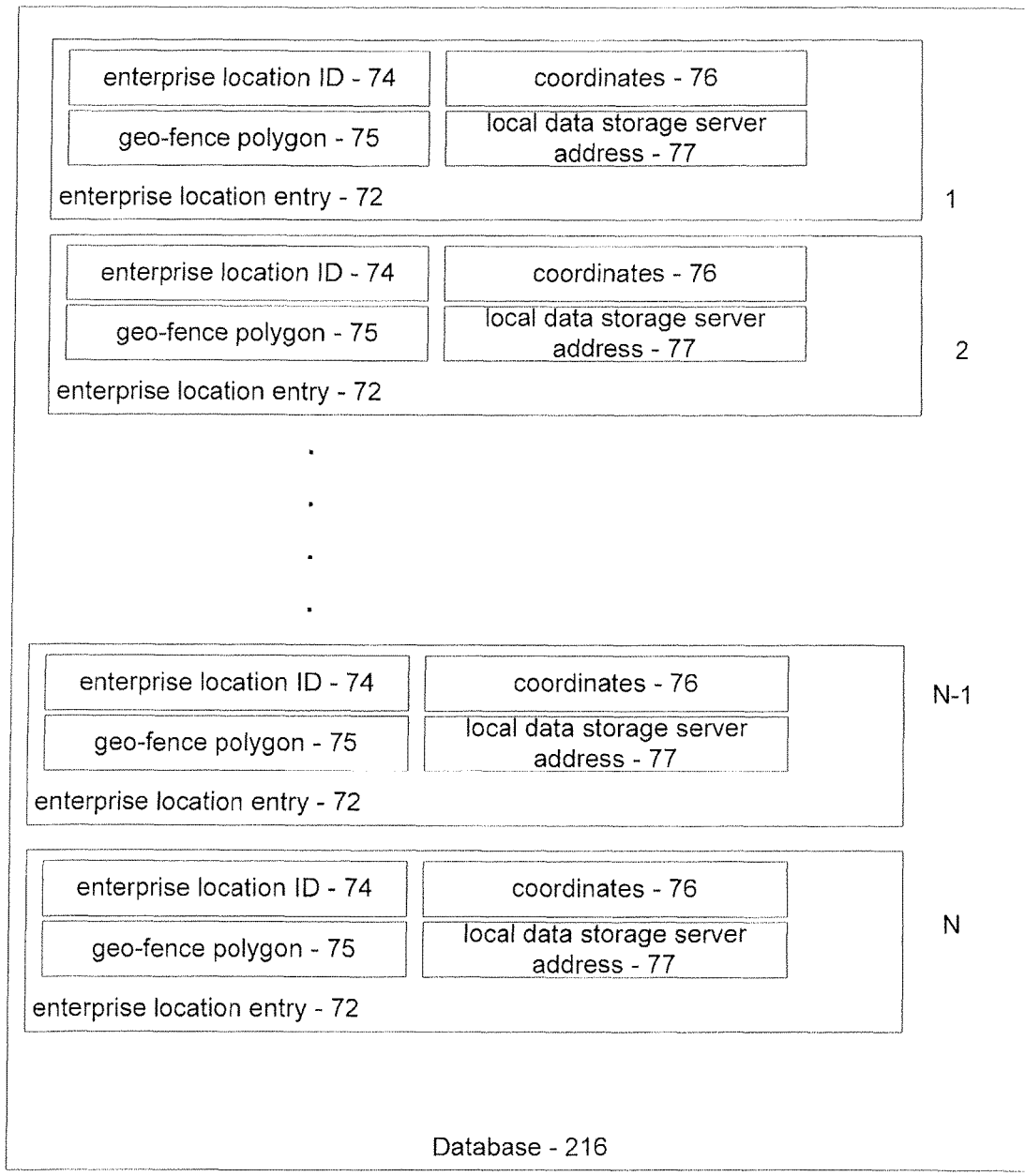
FIG. 3 is a block diagram of a component of the wireless field device of FIG. 2 according to an embodiment.

Referring to FIGS. 2 and 3, in some embodiments of the present invention, the storage device 214 includes a database 216 for enterprise location entries 72 that include geo-fence polygons 75 associated with a given enterprise location 70. The file transfer management application 206 utilizes the information from the enterprise location entries 72 to control the transfer of data files 30, discussed in more detail below. The database 216 may be relational databases or other known forms of databases. Enterprise location entries 72 are made for each enterprise location 70. Each enterprise location entry 72 includes an identifier 74 and the coordinates 76 of the geo-fence polygon 75. In addition, the enterprise location entry 72 includes the address 77 of at least one data storage server 50 associated with a particular enterprise location 70. For example, FIG. 1 illustrates a data storage server 50(b) associated with enterprise location 70(b). A corresponding enterprise location entry 72 would include the coordinates 76 that define the geo-fence polygon 75(b) that matches the borders of the enterprise location 70(b), as well the local data storage server address 77 of the associated data storage server 50(b).

In some embodiments of the present invention, the wireless field devices 20 may be associated with specific enterprise locations 70. For example, a police department may be divided into precincts, with each precinct having a home base with parking lots and/or repair garages (enterprise locations 70). A particular patrol car, and accompanying wireless field device 20, may be assigned to a particular precinct and corresponding enterprise location(s) 70. In such instances, the wireless field device 20 may employ a field device profile 213. FIG. 4 illustrates a field device profile 213 according to one embodiment of the present invention. The field device profile 213 includes information associated with the wireless field device 20 on which it is stored.

The field device profile 213 may include a field device identifier 240, which is unique to the wireless field device 20. The field device profile 213 may also include a home enterprise location identifier 242 that identifies which enterprise location 70 to which the wireless field device 20 is assigned. The field device profile 213 may also include the local data storage server IP address 244 of the local data storage server 50 associated with the home enterprise location of the wireless field device 20. For example, referring to FIG. 1, wireless field device 20(*a*) is assigned to enterprise location 70(*a*), and the home enterprise location identifier 242 would identify enterprise location 70(*a*), with the local data storage server IP address 244 would provide the address of data storage server 50(*a*). The field device profile 213 may also include the central data storage server IP address 246 of the central data storage server 50 associated with the file uploading management system 10. For example, referring to FIG. 1, the central server IP address 246 would indicate data storage server 50(*c*). The home enterprise location identifier 242 can be used to ensure that the uploading of data files only occurs when the wireless field device 20 is within the corresponding assigned enterprise location 70.

The field device profile 213 may also include a schedule 248 of the wireless field device 20. Referring back to the police department example, the patrol vehicle in which the wireless field device 20 is found may be scheduled for use on only certain days. In addition, the patrol vehicle can be assigned for use for only eight hour shift during the day, or two or three shifts depending on the needs of the police department/precinct. The schedule can be configured based upon the needs of the enterprise, which can be set by a system administrator.

The field device profile 213 may also include a data storage server preference indicator 250. The data storage server preference 250 indicates which data storage server 50 the date files 30 should be sent to if possible. The data storage server preference 250 can indicate that the data files 30 should be sent to the local data storage server 50 associated with the enterprise location 70 in which the wireless field device 20 is currently located (252), the local data storage server 50 associated with the assigned home enterprise location 70 (254), or the central data storage server 50 (256). The data storage server preference 250 may be set by a system administrator. In addition, the field device profile 213 may also include a priority data storage server address 258, which identifies which data storage server 50 to send the data file 30 when the data file 30 has been given a priority indicator 32, discussed in more detail below.

Referring back to FIG. 2, the wireless field device 20 may include a system bus 218 that connects various components of the wireless field device 20 to the system memory 208 and to the storage device 214, as well as to each other. Other components of the wireless field device 20 may include one or more processors or processing units 220, a user interface 222, and an input/output interface 224. In addition, the wireless field device 20 may include a network adapter 226 configured to communicate with other devices over various networks. The input/output interface 224 and/or the network adapter 226 may be configured to connect with a data recording system 40, discussed in more detail below.

In addition, some embodiments of the wireless field device 20 may include a GPS module 228 that is configured to continuously communicate with GPS satellites 90 discussed above in order to obtain the location (for example, the latitude and longitude) of the wireless field device 20 at a particular time, therefore also possibly including date and time information. In some embodiments of the present invention, such information may be collected once per second. However, the rate of obtaining such information varies depending on the needs of the wireless field device 20. In some embodiments of the present invention, the GPS module 228 may reside on an external GPS receiver connected to the wireless field device 20 or a chip set embedded within the wireless field device 20 with an external antenna. Examples of such chip sets include, but are not limited to, the SiRFSTAR III and SiRFSTAR IV GPS chip sets. As such, the GPS related information (latitude, longitude, time, date, speed, heading, and potentially altitude) may be calculated by the wireless field device 20 through the GPS module 228. The file transfer management application 206 can utilize information from the GPS modules 228 and the enterprise location entry database 216 to maximize the transfer of data files 30 from the data recording system 40, discussed below.

Referring to FIGS. 1 and 5, the wireless file uploading management system 10 may include data recording systems 40. The data recording system 40 captures various types of data to form the data files 30. The data recording systems 40 also include data recording devices 42 to assist in the capture of the data. As shown in FIG. 5, the data recording device 42 may be a video camera 42. However, the recording devices 42 utilized by the data recording systems 40 may include, but are not limited to, cameras, microphones, and other similar data-capturing devices.

The data recording system 40 may include a system memory 402 configured to store an operating system 404 and various software applications 406, including a verification application 408, discussed in more detail below. The data recording system 40 may also include data 410 that is accessible by the software applications 406. The data recording system 40 may include a mass storage device 412. The mass storage device 412 is configured to store data files 30 captured from the data recording devices 42. The storage capacity of the mass storage device 412 can vary based upon the type and amount of data captured by the data recording devices 42. For example, mass storage devices 412 for data recording systems 40 utilizing high resolution video cameras 42 may have data storage capacities ranging from 4 GB to 64 GB, or more, which accommodate the large data files 30 from video recordings (two hours of recording time can equal approximately two gigabytes of data).

In addition, the mass storage device 412 can be used for storing computer code, computer readable instructions, program modules, various databases 414, and other data for the data recording system 40. The mass storage device 412 can be used to back up or alternatively to run the operating system 404 and/or other software applications 406. The mass storage device 412 may include a hard disk, various magnetic storage devices such as magnetic cassettes or disks, solid state-flash drives, CD-ROM, DVDs or other optical storage, random access memories, and the like.

The data recording system 40 may include a system bus 416 that connects various components of the data recording system 40 to the system memory 402 and to the mass storage device 412, as well as to each other. Other components of the data recording system 40 may include one or more processors or processing units 418, a user interface 420 and an input/output interface 422 to which the data recording device 42 may connect. In addition, the data recording system 40 may include a network adapter 424 that is configured to communicate with other devices over various networks. For example, the network adapter 424 may be configured to connect the data recording system 40 to the network adapter 226 of the wireless field device 20. As stated above, many data recording systems 40 are only able to store the IP address of one "data storage server." The data recording system 40 may be configured to store the IP address of the wireless field device 30 to which to send the data files 30 via the network adapter 424 and connection through the network adapter 226 of the wireless field device 30. In other embodiments of the present invention, the data recording system 40 may have multiple input/output interfaces 422, allowing the data recording system 40 to connect to the input/output interface 224 of the wireless field device 20.

In addition, data recording system 40 may include a display adapter 426 that communicates with a display device 428, such as a computer monitor or other similar devices that present images and text in various formats. A enterprise employee, such as a system administrator or field employee, can interact with the data recording system 40 through one or more input devices (not shown), which include, but are not limited to, a keyboard, a mouse, a touch-screen, a microphone, a scanner, a joystick, and the like, via the user interface 420, or through the data recording device 42. The enterprise employee may use the user interface 420 or data recording device 42 to give a certain data file 30 being created or stored on the data recording system 40 a priority indicator 32 (shown in FIG. 1), discussed in more detail below.

While the embodiments of the present invention discussed above and shown in FIGS. 1-2 and 5 show the wireless field devices 20 and the data recording systems 40 as separate devices, the wireless field device 20 and the data recording systems 40 may be combined into one device in other embodiments of the present invention. In such embodiments, the combination wireless field device 20 and data recording system 40 may include all of the elements discussed above.

Figure 6:
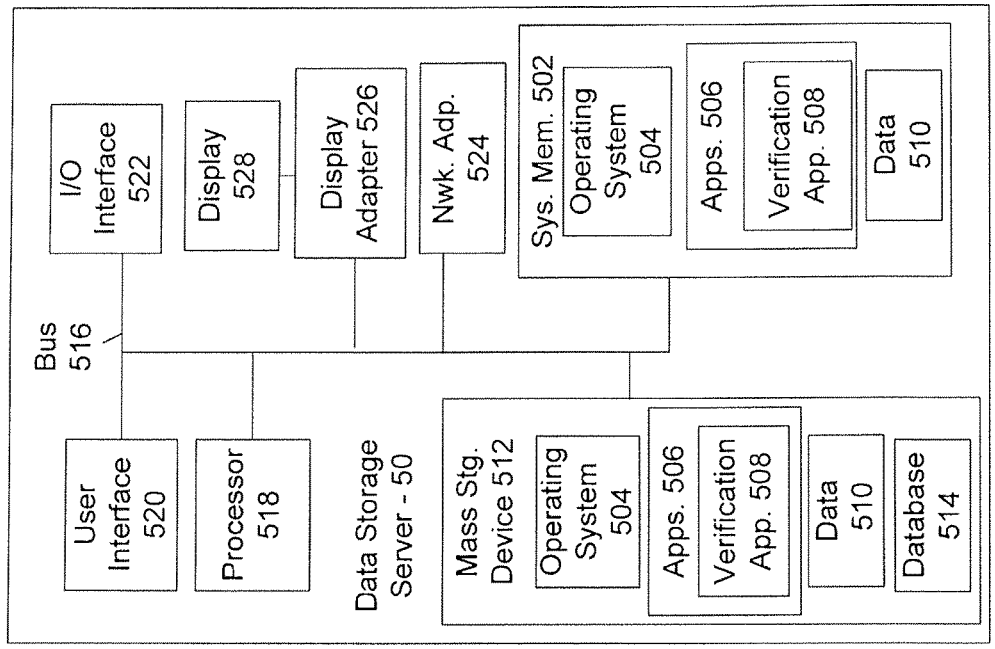
FIG. 6 is a block diagram of a data storage server of the file uploading management system of FIG. 1 according to an embodiment.

As shown in FIGS. 1 and 6, the wireless file uploading management system 10 may include data storage servers 50. In the embodiment of the present invention shown in FIG. 1, the data storage servers 50 may be local data storage servers 50(a), 50(b) or enterprise data storage servers 50(c). The local data storage servers 50(a), 50(b) may be associated with a given enterprise location 70(a), 70(b).

Referring to FIG. 6, the data storage server 50 may have several applications 506, including, but not limited to, a verification application 508 that corresponds to the verification application 508 of the data storage device 40. The data storage server 50 and its applications 504 may utilize elements and/or modules of several nodes or servers. For example, the data storage servers 50 may include storage area networks (SANs), which comprise a network of storage servers with a plurality of disk drives. Embodiments of the system 10 that manage the uploading and transferring of video data files 30 may utilize specialized SANs 50 dedicated to retain video data files. Such SANs 50 may be operated or supplied by various vendors, including, but not limited to EMC, Fujitsu, IBM, HP, Brocade and Dell, among others. In any event, the data storage server 50 should be construed as inclusive of multiple modules, software applications, servers and other components that are separate from the wireless field devices 20, data recording systems 40, and wireless access points 60.

The data storage server 50 includes its own system memory 502, which stores the operating system 504 and various software applications 506, including the verification application 508. Other software applications 506 may be configured to catalogue, review, forward and archive the data files 30 received and stored on the data storage server 50. The data storage server 50 may also include data 510 that is accessible by the software applications 506. The data storage server 50 may include a mass storage device 512. The mass storage device 512 is configured to store the data files 30 originating from the data recording devices 40. In addition, the mass storage device 512 can be used for storing computer code, computer readable instructions, program modules, various databases 514, and other data for the data storage server 50. The mass storage device 512 can be used to back up or alternatively to run the operating system 504 and/or other software applications 506. The mass storage device 512 may include a hard disk, various magnetic storage devices such as magnetic cassettes or disks, solid state-flash drives, CD-ROM, DVDs or other optical storage, random access memories, and the like.

The data storage server 50 may include a system bus 516 that connects various components of the data storage server 50 to the system memory 502 and to the mass storage device 512, as well as to each other. Other components of the data storage server 50 may include one or more processors or processing units 518, a user interface 520, an input/output interface 522, and a network adapter 524 that is configured to communicate with other devices, including, but not limited to, the wireless access points 60, other data storage servers 50, and network switching devices 86. The network adapter 524 can communicate over various networks 80. In addition, the data storage server 50 may include a display adapter 526 that communicates with a display device 528, such as a computer monitor and other devices that present images and text in various formats. A system administrator can interact with the data storage server 50 through one or more input devices (not shown), which include, but are not limited to, a keyboard, a mouse, a touch-screen, a microphone, a scanner, a joystick, and the like, via the user interface 520.

Figure 7:
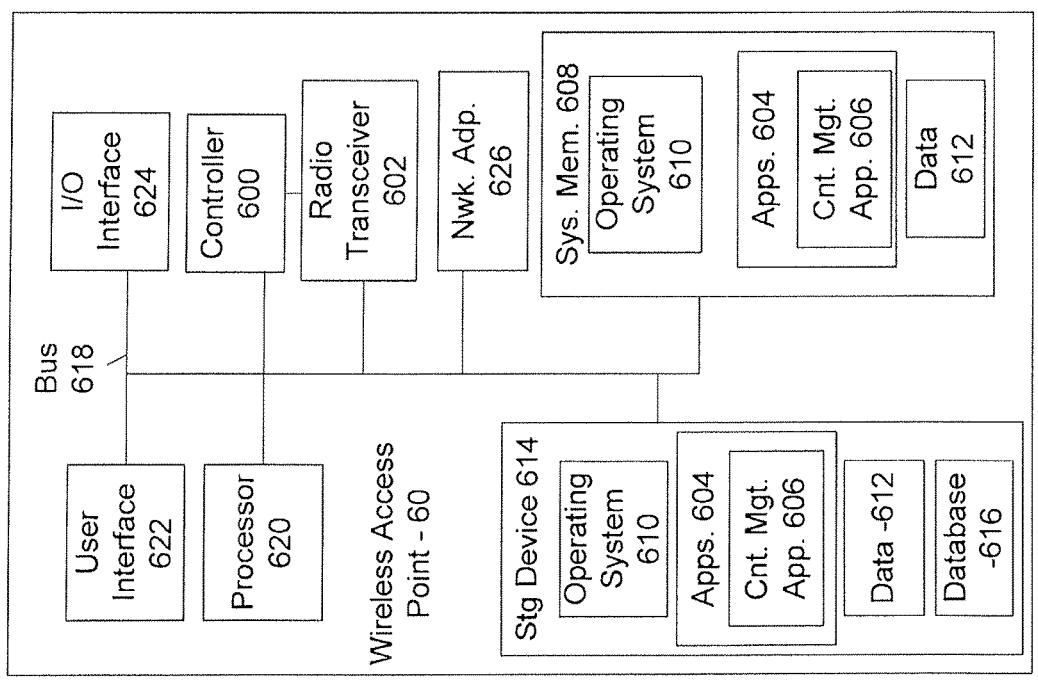
FIG. 7 is a block diagram of a wireless access point of the file uploading management system of FIG. 1 according to an embodiment.

As shown in FIGS. 1 and 7, the file uploading management system includes wireless access points 60. The wireless access points 60 provide a means for the wireless field devices 20 to wirelessly upload the data files 30 from the data recording systems 40 to the data storage servers 50. As shown in FIG. 1, the wireless access points 60 are configured to communicate with the wireless field devices 20 that fall within a communication range 61 of the wireless access point 60. Multiple wireless access points 60 may be employed at various enterprise locations 70 to ensure wireless communication coverage throughout the enterprise location 70. For example, two wireless access points 60(a), 60(b), and their respective communication ranges 61(a), 61(b) are needed to make sure that the enterprise location 70(a) is mostly covered, whereas the communication range 61(c) of one wireless access point 60(c) is enough to mostly cover enterprise location 70(b). In other embodiments of the present invention, wireless access points 60 may be employed to cover the entirety of the enterprise location 70. In addition, the wireless access points 60 may send broadcast messages to the wireless field devices 20 indicating the availability of the wireless access points 60 and other messages announcing the available throughput associated with the wireless access point 60 and the various data storage servers 50, discussed in more detail below.

Referring to FIG. 7, the wireless access points 60 includes a combination wireless interface controller 600 and radio transceiver 602 similar to the wireless interface controller 200/radio transceiver 202 combination of the wireless field devices 20 discussed above. Accordingly, the wireless interface controller 600 and radio transceiver 602 of the wireless access points 60 are configured to operate in concert with the wireless interface controller 200 and radio transceiver 202 of the wireless field devices 20. Therefore, the communication attributes (i.e., frequency, protocols, etc.) described in connection with the wireless interface controller 200 and radio transceiver 202 of the wireless field devices 20 apply to the wireless interface controller 600 and radio transceiver 602 of the wireless access points 60.

Further, the wireless interface controller 600 of the wireless access point 60 can limit the radio transceiver 602 to connect/transmit with a finite number of wireless field devices 20. Such limits can be set up by system administrators. The wireless interface controller 600 and the radio transceiver 602 are configured to receive and send multiple signals and data at the same time. For example, the radio transceiver 602 can send messages to the wireless field devices 20 and other wireless access points 60 while the radio transceiver 602 is receiving data files 30 from the wireless field devices 20.

Referring to FIG. 7, in addition to the wireless interface controller 600 and radio transceiver 602, the wireless access point 60 may have one or more software applications 604, including a connection management application ("Cnt. Mgt. App.") 606, which monitors the connections between the wireless field devices 20 and the radio transceiver 602 of the wireless access point in order to maximize the uploading of data files 30, as well as the communications between the wireless access points 60 and the data storage servers 50. The wireless access point 60 includes system memory 608, which can store the various applications 604, including, but not limited to, an operating system 610 of the wireless access point 60 and the connection management application 606. The system memory 608 may also include data 612 accessible by the various software applications. The system memory 608 can include random access memory (RAM) or read only memory (ROM). Data 612 stored on the wireless access point 60 may be any type of retrievable data. The data may be stored in a wide variety of databases, including relational databases, including, but not limited to, Microsoft Access and SQL Server, MySQL, INGRES, DB2, INFORMIX, Oracle, PostgreSQL, Sybase 11, Linux data storage means, and the like.

The wireless access point 60 can include a variety of other computer readable media, including a storage device 614. The storage device 614 can be used for storing computer code, computer readable instructions, program modules, various databases 616 and other data for the wireless access point 60. The storage device 614 can be used to back up or alternatively to run the operating system 610 and/or other applications 604, including the connection management application 606. The storage device 614 may include a hard disk, various magnetic storage devices such as magnetic cassettes or disks, solid-state flash drives, CD-ROM, DVDs or other optical storage, random access memories, and the like.

The wireless access point 60 may include a system bus 618 that connects various components of the wireless access point 60 to the system memory 608 and to the storage device 614, as well as to each other. Other components of the wireless access point 60 may include one or more processors or processing units 620, a user interface 622, an input/output interface 624, and a network adapter 626 that is configured to communicate with other devices, such as the data storage servers 50 over the network 80.

Referring to FIG. 1, the wireless access points 20 may be connected to the data storage server 60 through a network 80. The network 80 shared by the data storage servers 50 and wireless access points 60 may include local area networks (LAN) 82 and wide area networks (WAN) 84. The network(s) 80 may include, but are not limited to, local 100 MB or 1 GB local area networks, T1, T3/DS3, SONET Ring, Frame relay, ATM, or other wide area, wired, microwave, or wireless networks. The throughputs of these networks 80 may vary as well. In addition, the network 80 may be made up of multiple independent LANs 82 and multiple independent WANs 84. A network switching device 86 can be utilized by some embodiments of the file uploading management system 10 to direct communication, including the data packets forming the data files 30, between the wireless access points 60 and the data storage servers 50. Along the same lines, the wireless access points 60 of the file uploading management system 10 do not have to share the same SSIDs, nor do the wireless access points 60 need to have all different SSIDs.

Referring back to FIG. 2, the file transfer management application 206 of the wireless field device 20 is configured to direct the transfers of data files 30 between the radio transceivers 202, 602 of the wireless field devices 20 and wireless access points 60, as well directing the data files from the wireless access points 60 to the data storage servers 50 through the network 80 based upon the location of the wireless field device 20 within a given enterprise location 70. The file management application 206 can call upon numerous components of the wireless field device 20 and the data recording device 40, including, but not limited to, the wireless interface controller 200, the radio transceiver 202, the enterprise location database 216, the wireless field device profile 213, the GPS module 228, and the data file 30, as well as the data storage servers 50 and wireless access points 60 in order to ensure efficient upload of the data files 30.

Figure 8:
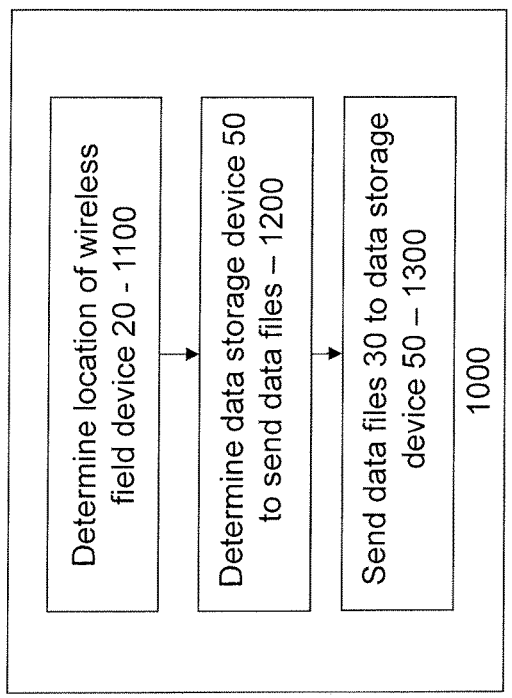
FIG. 8 is flow diagram of a method performed by a wireless field device according to an embodiment.

FIG. 8 depicts a flow diagram 1000 that illustrates the operation of the file transfer management application 206 according to one embodiment of the present invention. The transfer management application 206 is configured to determine the current enterprise location 70 in which the wireless field device 20 is located (step 1100), determining the correct data storage server 50 to which to send the data files 30 (step 1200), and sending the date files 30 to the correct data storage server 50 (step 1300).

Figure 9:
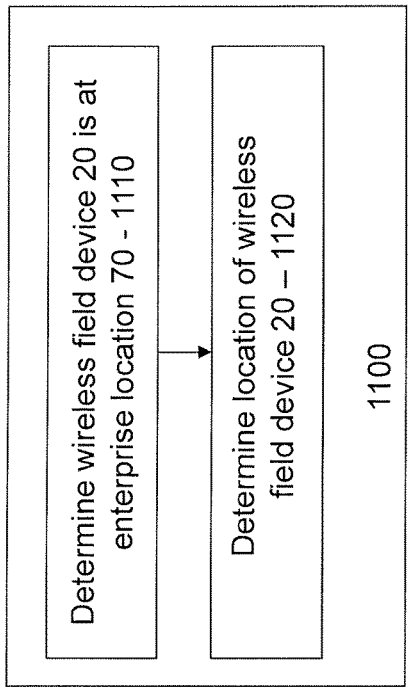
FIG. 9 is a flow diagram of part of the method of FIG. 8 according to an embodiment.

FIG. 9 depicts a flow diagram illustrating how the file transfer management application 206 determines the current enterprise location 70 in which the wireless field device 20 is located (step 1100) according to one embodiment of the present invention. The file transfer management application 206 will first determine whether or not the wireless field device 20, and the associated data recording system 40, is within an enterprise location 70 (step 1110). In one embodiment of the present invention, the file transfer management application 206 will await a notification from the enterprise location 70 to determine whether or not the wireless field device 20 is within an enterprise location 70. As discussed above, the wireless access points 60 may send out broadcast messages to wireless field devices 20. If the wireless field device 20 receives a broadcast message from a wireless access point 20, the file transfer management application 206 will recognize that the wireless field device 20 is within an enterprise location 70. In some embodiments of the present invention, the file transfer management application 206 may not be activated until the wireless field device 20 receives a broadcast message from the wireless access point 60.

In another embodiment of the present invention, the file transfer management application 206 can determine whether or not the wireless field device 20 is within an enterprise location 70 (step 1100) by simply determining the location of the wireless field device 20 and comparing the location information to the coordinates 76 of the enterprise location entries 72. If the file transfer management application 206 finds an enterprise location entry 72 that has coordinates 76 that contain the location information of the wireless field device (which may be supplied by the GPS module 228), the file transfer management application 206 will know that the wireless field device 20 is within an enterprise location 70. If no corresponding enterprise location entry 72 is found, the file transfer management application 206 will know that the wireless field device 20 is not within an enterprise location 70, and will not upload any data files 30. The file transfer management application 206 may employ this method in addition to the receiving of broadcast messages discussed above in order to ensure that the broadcast messages are not fake or spoofed by rogue access points and devices configured to look like an authorized wireless access point 60. Along the same lines, the file transfer management application 206 may also instruct the wireless field device 20 to ignore any broadcast messages from the wireless access points 60 the wireless field device 20 may receive when the wireless field device 20 is not within the enterprise location 70.

If the file transfer management application 206 determines that the wireless field device 20 is within an enterprise location 70, the file transfer management application 206 will then determine the location of the wireless field device 20 (step 1120), if the file transfer management application 206 has not already done so. The file transfer management application 206 can call on the GPS module 228 to provide location information of the wireless field device 20.

Figure 10:
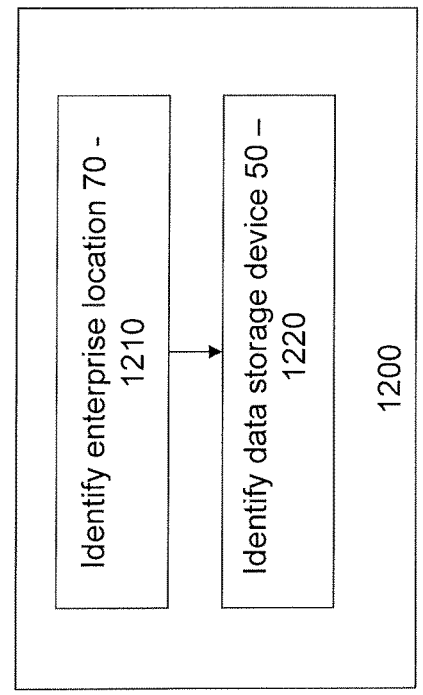
FIG. 10 is a flow diagram of part of the method of FIG. 8 according to an embodiment.

Once the location of the wireless field device 20 has been determined, the file transfer management application 206 will then determine the correct data storage server 50 to which to send the data files 30 (step 1200), as illustrated by the flow diagram of depicted in FIG. 10. Using the location information provided by the GPS module 228, the file transfer management application 206 will access the enterprise location entry database 216 to identify the enterprise location 70 in which the wireless field device 20 is located (step 1210). As discussed above, the enterprise location entries 72 include the known coordinates 76 (e.g., longitude and latitude of area) of a particular boundary for each enterprise location 70. The file transfer management application 206 will then identify the enterprise location entry 72 with known coordinates 76 in which that the wireless field device 20 is found, using the location information supplied by the GPS module 228. Once the corresponding enterprise location entry 72 has been identified, the file transfer management system 206 can identify the local data storage server 50 associated with the enterprise location 70 (step 1220) by using the local data storage server address 77 found in the enterprise location entry 72.

Once the address 77 of the data storage server 50 has been identified, the file transfer management application 206 will then send the data file 30 to the data storage server 50 (step 1300). The file transfer management application 206 will call on the wireless interface controller 200 and radio transceiver 202 to send the data file 30, while supplying the address 77 of the data storage server 50. The wireless interface controller 200 and radio transceiver 202 will then transfer the data file 30 according to the protocols employed and through methods known in the art.

Figure 11:
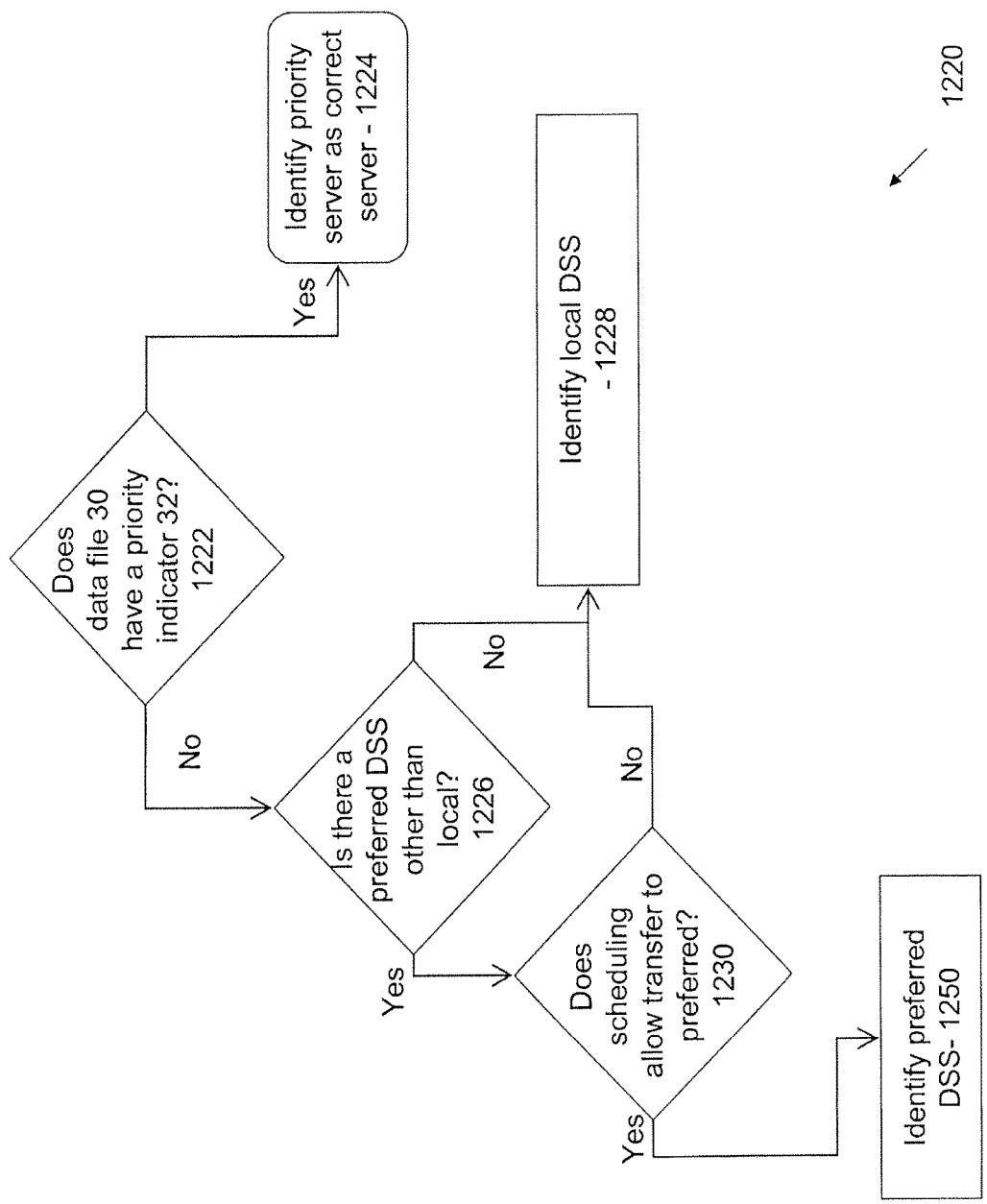
FIG. 11 is a flow diagram of part of the method of FIG. 10 according to an embodiment.

FIG. 11 shows additional steps performed by the file transfer management application 206 to identify the data storage device 50 (step 1220) to which to send the data files 30 according to another embodiment of the present invention. As discussed above, the wireless field device 20 may include a field device profile 213. The file transfer management application 206 may utilize the field device profile 213 to determine if the data file 30 may be sent to a preselected data storage server 50 if certain conditions are met. As shown in FIG. 11, the file transfer management application 206 may determine whether or not the data file 30 has been given a priority indicator 32 (step 1222). If the data file 30 has been given a priority indicator 32, the file transfer management application 206 will then send the data file 30 to the designated priority server (step 1224), using the priority data storage server IP address 248 found in the profile 213.

If the data file 30 does not have a priority indicator 32, the file transfer management application 206 will then determine whether or not there is a preferred data storage server 50 other than the local data server 50 to which the data files 30 should be sent (step 1226). If the field device profile 213 indicates that the local server 252 is preferred, the file transfer management application 206 will identify the local data storage server 50 as the destination of the data file 30 (step 1228). If other data storage servers 50 (the central data storage server 252 or the home data storage server 254) are indicated as being the preferred destination of the data files 30, the file transfer management application 206 can determine if the schedule 248 of the wireless field device 20 allows the transfer of the data file 30 to the preferred destination (step 1230). If the schedule does allow the transfer of the data file 30 to the preferred destination, the file transfer management application will identify the preferred data storage server (Home 254, Central 256) as the destination data storage server 50, including providing the corresponding IP address (Home address 246, Central server address 248) to the wireless interface controller 200 and radio transceiver 202 (step 1250). If the schedule does not permit the data file 30 to be transferred to the preferred server, the file transfer management application 206 will identify the local data storage server (step 1228).

Figure 12:
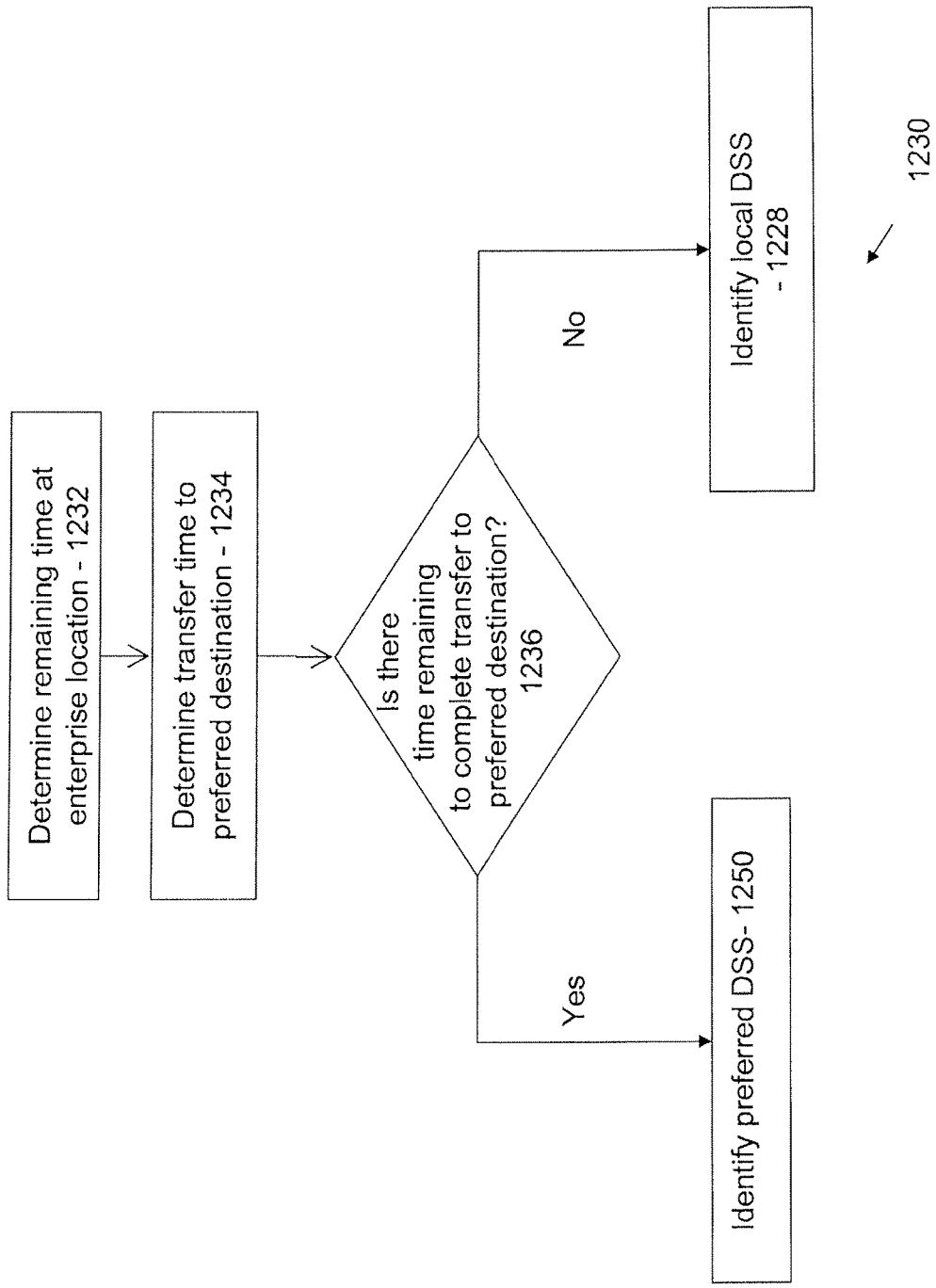
FIG. 12 is a flow diagram of part of the method of FIG. 11 according to an embodiment.

FIG. 12 depicts a flow diagram 1230 that illustrates how the file transfer management application 206 determines whether or not the schedule 248 of the wireless field device 20 will permit the data file 30 to be sent to the preferred data storage server 50 according to an embodiment of the present invention. As shown in FIG. 4, the field device profile 213 may include the schedule 248 of the wireless field device 20. For example, referring back to the police department example, a patrol vehicle can be assigned for use for only a single eight hour shift during the day, or two or three shifts depending on the needs of the police department/precinct. The file management application 206 can call on the schedule 248 found in the profile 213 to determine the remaining time that the wireless field device 20 will remain at the present location of the wireless field device 20 (step 1232). The file transfer management application 206 can call upon the date and time information provided by the GPS module 228 to make this calculation, or call upon one of the other applications 204 or operating system 208 to provide data and time information.

Once step 1232 is completed, the file transfer management application 206 can then determine the time it will take to transfer the data file 30 to the preferred destination/data storage server 50 (step 1234). The file transfer management application 206 can determine if the wireless field device 20 will be able to complete the data file transfer within the remaining time at the enterprise location (step 1236). If there is enough time remaining to complete the data file transfer, the file transfer management application 206 will identify the preferred data storage server 50 (home server 254, central server 256) as the destination for the data file 30 (step 1250) to the wireless interface controller 200, including providing the corresponding address (home server address 244, central server address 246). If there is not enough time to complete the transfer, the local server 50 will be identified (step 1228), providing the local data storage server address 77 instead.

Figure 13:
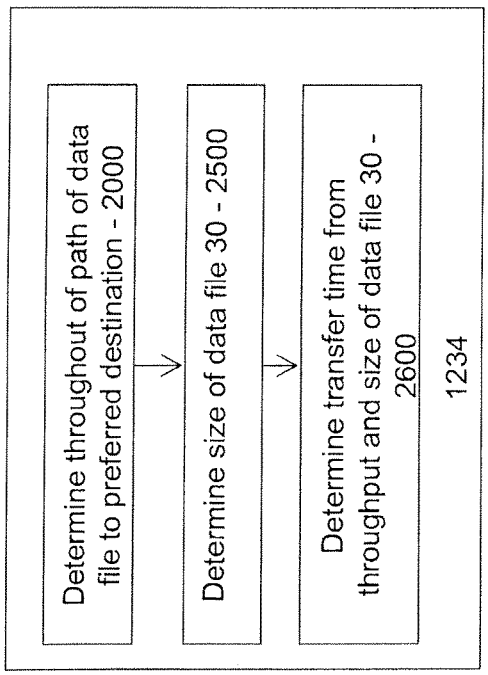
FIG. 13 is a flow diagram of part of the method of FIG. 12 according to an embodiment.

FIG. 13 depicts a flow diagram that illustrates how the file transfer management application 206 determines the transfer time to the preferred destination (step 1234) according to one embodiment of the present invention. The file transfer management application 206 will determine the throughput that the data file 30 will experience going from the wireless field device 20 to the preferred data storage server 50 through the wireless access point 20 and network 80 (step 2000). The file transfer management application 206 may call on the wireless access point 60 to provide the throughput, or the wireless access point 60 may voluntarily provide the information, for example, by providing the throughput of all potential paths through a broadcast message. The file transfer management application 206 may then determine the size of the data file 30 (step 2500). The file transfer management application 206 can obtain file size information from the data file 30 itself, or call upon the data recording system 40 to provide the information. Once the throughput and data file size information has been obtained, the file transfer management application 206 can then determine the transfer time needed for the data file 30 to be transferred to the preferred data storage server 50 (step 2600). The file transfer management application 206 may simply divide the size of the data file by the throughput.

Figure 14:
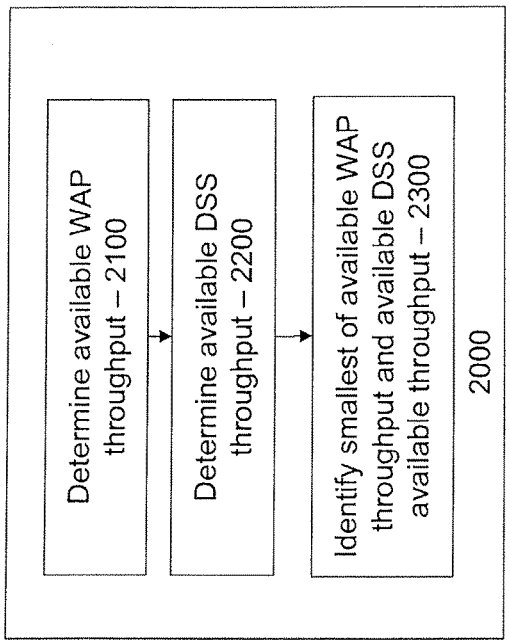
FIG. 14 is a flow diagram of part of the method of FIG. 13 performed by a wireless access point according to an embodiment.

FIG. 14 depicts a flow diagram that illustrates how the connection management application 606 of the wireless access point 60 determines the available throughput through the wireless access point 60 to the preferred destination data storage server (step 2000) according to one embodiment of the present invention. The connection management application 606 may determine the available throughput of the entire file path that the data file 30 may take from the wireless field device 20 to the preferred data storage server 40. To do so, the connection management application 606 will determine the available wireless access point throughput (available WAP throughput) (step 2100), determine the available data storage server throughput (available DSS throughput) (step 2200), and identify the smaller of the two (step 2300).

The connection management application 606 may determine the available WAP throughput by determining the available throughput between the wireless field devices 20 and wireless access point 60 (step 2100). The connection management application 606 determines the available WAP throughput by subtracting the total consumed throughput of the wireless field devices 20 to the wireless access point 60 from the maximum throughput of the same path. The connection management application 606 can call on the radio transceiver 602 and wireless interface controller 600 to provide the consumed throughput caused by the transmission of data files 30 from the wireless field devices 20 to the wireless access point 60. The connection management application 606 can also call on the wireless interface controller 600 and radio transceiver 602 to provide the maximum throughput as well, which is determined based upon the protocol/frequency combination being used. For example, if the wireless access points 60 are using IEEE 802.11a, the maximum throughput is 54 Mbps. When determining the total consumed throughput, the connection management application 606 takes into consideration all of the transfers of data files 30 that occur at the wireless access point 60. The available WAP throughput may be reported as a percentage, value, or some other representative form.

The connection management application 606 may then determine the available DSS throughput by determining the available throughput between the wireless access point 60 and the preferred data storage server 50 (step 2200). The connection management application 606 determines the available DSS throughput by subtracting the total consumed throughput from the wireless access point 60 to the preferred data storage server 50 from the maximum throughput of the same path. The maximum throughput is determined by the network 80. For example, if the system is utilizing a 1 GB local network, the maximum throughput is 1 GB. The connection management application 606 can call on the network adapter 626 to provide the consumed throughout information and maximum throughput information of the wireless access point 60 and the preferred data storage serves 50 through the network 80, including the speed of the WAN 84 or LAN 82 to which the preferred data storage server 50 is connected to the wireless access point 60. The available DSS throughput may be reported as a percentage, value, or some other representative form.

Once steps 2100 and 2200 are complete, the connection management application 606 will determine the overall available throughput by identifying the smaller available throughput between the available WAP throughput and the available DSS throughput (step 2300). The smaller of the two available throughputs is the bottle neck on the path that the data file 30 will travel, and dictates the overall throughput.

While the particular embodiment of the present invention illustrated in FIG. 14 takes into consideration of the available WAP throughput or available DSS throughput, some embodiments of the present invention may only take into consideration the maximum throughput between the wireless field device 20 and wireless access point 60 as well as the maximum throughput between the wireless access point 60 and the preferred data storage server 50, or just the maximum throughput between the wireless access point 60 and the preferred data storage server 50. Regardless, the throughput produced may be used as described in reference to FIG. 12.

Figure 15:
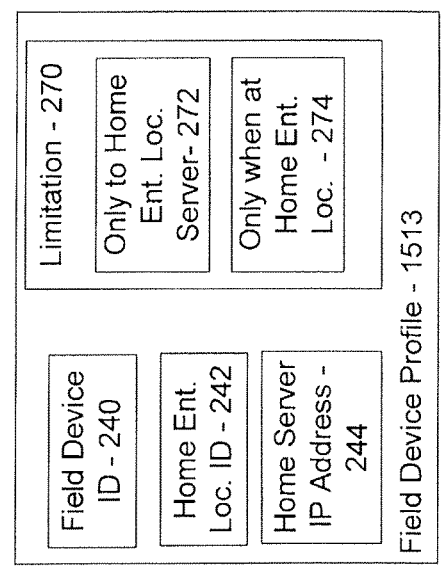
FIG. 15 is a block diagram of another wireless field device profile of a wireless field device according to an embodiment.

The file transfer management application 206 may prohibit the uploading of any data files 30 to data storage servers 50 that are not associated with the enterprise location 70 to which the wireless field device is assigned. For example, FIG. 15 illustrates a wireless field device profile 1513 according to another embodiment of the present invention. The wireless field device profile 1513 includes the field device ID (240), the home enterprise location identifier (242), and the IP address (244) of the local data storage server 50 associated with the enterprise location 70 to which the wireless field device 20 is assigned. In addition, the wireless field device profile 1513 includes limitations 270 of the uploading of the data file 30. For example, the limitation can limit the uploading of the data file 30 only to the data storage server 50 associated with the home enterprise location of the wireless field device 20 (272). Further, the profile 1513 can include an additional limitation that the data file 30 can only be uploaded when the wireless field device 20 is located within the home (assigned) enterprise location 70 (274). The limitations 270 are not limited to the two examples discussed in connection to FIG. 15. For example, additional limitations 270 can include, but are not limited to, that the data file 30 can only be loaded to only enterprise data storage servers 50(*c*). Further, limitations 270 can be based upon the location of the wireless field device 30, and other various factors.

Having thus described embodiments of the operation of the file transfer management application 206, those skilled in the art will appreciate that the steps of the various methods above may be performed in a different order or combination. For example referring to FIG. 13, determining the throughput of the path of the data file (step 2000) may occur after the size of the data file 30 is determined (step 2500). Likewise, referring to FIG. 14, the file transfer management application may determine the available DSS throughput (step 2200) before determining the available WAP throughput (step 2100). Additionally, some of the steps described in the methods above may not need to be performed.

Figure 16:
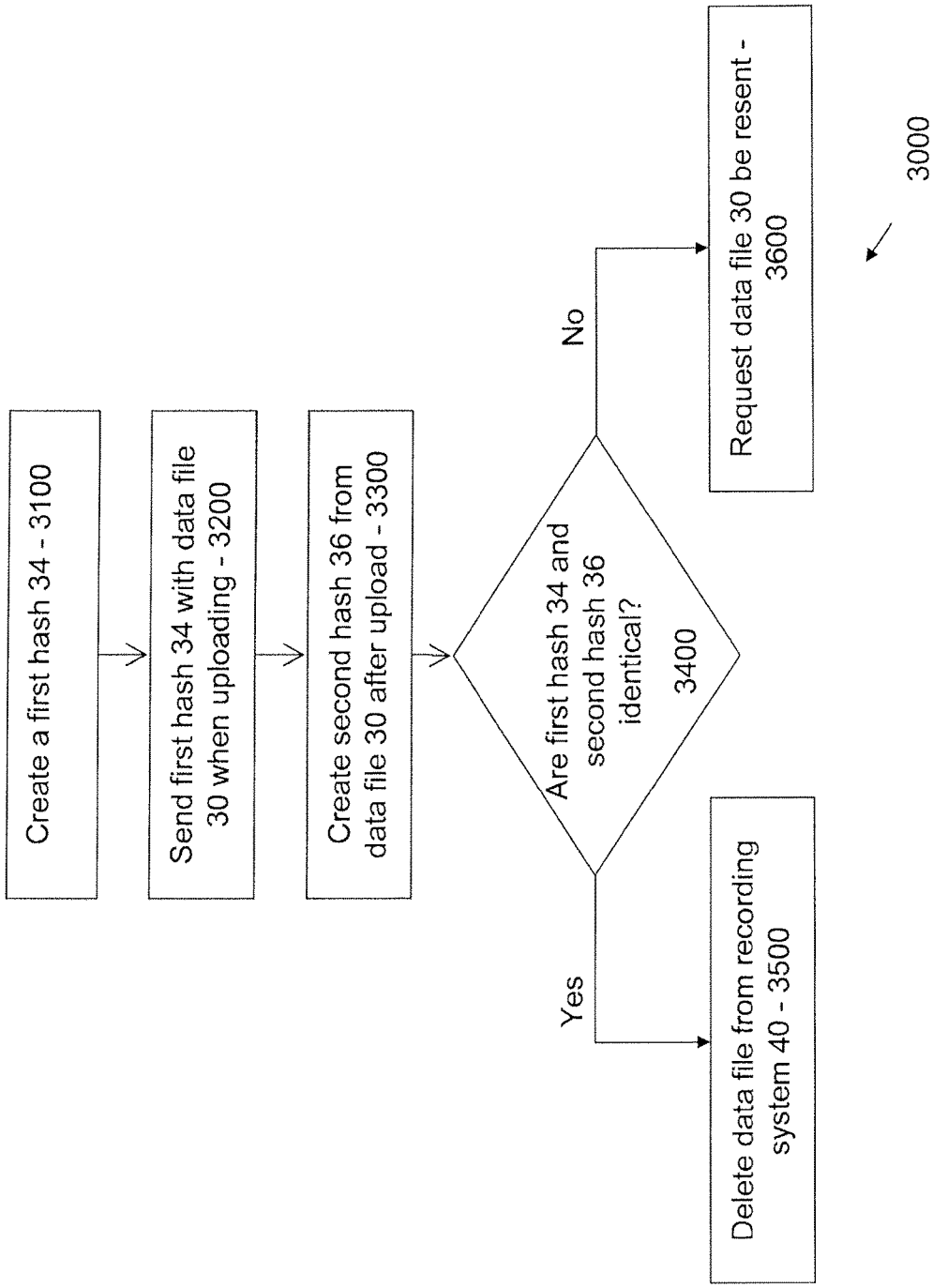
FIG. 16 is a flow diagram of a method performed by components of the system of FIG. 1.

FIG. 16 depicts a flow diagram 3000 that illustrates the conjunctive operation of the verification applications 408, 508 of the data recording system 40 and the data storage server 50 respectively to confirm that a chain of custody has been preserved upon the transfer of a data file 30. The verification application 408 of the data recording system 40 and the verification application 508 of the data storage server(s) 50 work in conjunction with one another to establish a chain of custody for the data file 30 as it is transferred from the data recording system 40 by the wireless field device 20 to the data storage server 50 through the wireless access point 60.

The data recording system 40 will call upon the verification application 408 after the data file 30 (i.e., video recording) has been created by the data recording system 40 through the data recording device 42. The verification application 408 may utilize hashing algorithm(s) to generate a value called a hash from the information contained in and related to the data file 30 (e.g., size, contents, type, etc.). Such hashing algorithms are well known in the art. For example, the hashing algorithm may include an MD5 hashing algorithm. The verification application 408 will create a first hash 34 from the data file 30 using the hashing algorithms (step 3100). The first hash 34 is then sent the data file 30 when the wireless field device 20 uploads the data file 30 to data storage server 50 through a wireless access point 60 (step 3200).

Once the data file 30 has been received at the data storage server 50, the verification application 508 of the data storage server 50 will then create a second hash 36 from the data file 30 using the same hash algorithm as used by the verification application 408 of the data recording system 40 (step 3300). The verification application 508 of the data storage server 50 will then retrieve the first hash 34 from the data file 30 and compare the first hash 34 to the second hash 36 to determine if they are identical (step 3400). If the first hash 34 and the second hash 36 are identical, the chain of custody is confirmed as preserved, and the verification application 508 of the data storage server 50 will notify the verification application 408 of the data recording system 40, allowing the data recording system 40 to purge the data file 30 from the mass data device 412 (step 3500). If the first hash 34 is not identical to the second hash 36, the chain of custody has not been preserved. Upon such a finding, the verification application 508 of the data storage server 50 will request that the data file 30 be resent (step 3600).

Once a data file 30 has been uploaded to a local data storage server 50(*a*), 50(*b*), the file uploading management system 10 may forward the data file 30 to the enterprise data storage server(s) 50(*c*) or another preferred location. The data storage servers 50 may include applications that automatically send data files 30 to a predetermined data storage server 50, or a system administrator can direct one data storage server 50 to send all data files 30 to another data storage server 50. The forwarding of data files 30 can be done immediately upon the completion of the verification process illustrated in FIG. 16, or the forwarding of data files 30 may be done on a scheduled basis (e.g., at the end of a shift).

In addition, if there was a preferred data storage server 50 to which the data file 30 was suppose to be uploaded to but could not be done based upon various time restraints (see step 1230 in FIGS. 11 and 12), the file management application 206 may include, or direct the wireless interface controller 200 and radio transceiver 202 to include, an identifier or the actual IP address of the preferred data storage server 50 in the data file 30 when the data file 30 is transferred. Such additional identifiers and/or IP addresses may be configured into the data packets through methods known in the art. However, before any data file 30 can be forwarded on, it is important that the data file 30 be verified to ensure that the chain of custody was preserved.

In some embodiments of the present invention, the uploading of data files 30 may be interrupted before the upload is completed. In such instances, the data storage servers 50 may be configured to retain the uploaded segment of the data file 30, which can then be combined with the remaining segment of the data file 30 uploaded at a later date. In such instances, the verification process may be done once the segments of the data file 30 can be combined. In other embodiments of the present invention, the data storage devices 50 may be configured to reject incomplete data files 30.

The advantages of the present invention include, without limitation, minimizing the collective elapsed time for multiple wireless field devices 20 to upload data files to more than one data storage server 50. Minimizing the elapsed time to upload data files 30 minimizes unproductive administrative time spent waiting by the field personnel associated with the data recording systems 40 and wireless field devices 20 for file uploads to complete and allows the data recording systems 40, and the accompanying field personnel, to get back into the field, performing their respective duties. For large organizations with hundreds of field staff, the cost savings of reducing file upload times by even 10 minutes per shift represents millions of dollars per year in the value of staff time that can be deployed to more productive use. Likewise, a reduced staff can handle the existing workload, also reducing costs. To the extent that expensive vehicles and equipment are more available for work, the enterprise can get more work done with the existing fleet of equipment, or get the existing workload done with less equipment. Reducing equipment requirements reduces capital costs, vehicle maintenance expenses, and asset tracking effort and expense. Fuel usage should also be reduced, and therefore fuel cost, plus the enterprise carbon footprint will be reduced. In addition, getting more work done with internal crews that formally was overflow performed by outside contractors will provide quantifiable hard dollar savings by reducing cash payments to outside contractors.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A file upload management system for uploading data files across multiple enterprise locations comprising:
   a. a plurality of data storage servers connected to a network, wherein a portion of the plurality of data storage servers are local data storage servers, wherein each local data storage server is associated with one of the multiple enterprise locations;
   b. a plurality of wireless access points configured to communicate with the plurality of data storage servers over the network, wherein a portion of the plurality of wireless access points are located within the multiple enterprise locations; and
   c. at least one wireless field device comprising:
      i. a GPS providing means configured to provide current location information of the at least one wireless field device;
      ii. an enterprise location entry database comprising a plurality of enterprise location entries, wherein each one of the multiple enterprise locations has an enterprise location entry, the enterprise location entry comprises:
         A. coordinates associated with a geo-fence polygon that defines boundaries of the enterprise location; and
         B. a local data storage server IP address of the local data storage server associated with the enterprise location; and
      iii. a file transfer management application associated with a processor, wherein the file transfer management application is configured to:
         A. determine the enterprise location in which the at least one wireless field device is presently located by using the current location information from the GPS providing means to find the enterprise location entry containing the coordinates that correspond with the current location information; and
         B. identify the local data storage server associated with the enterprise location in which the at least one wireless field device is located from the corresponding enterprise location entry, wherein the at least one wireless field device is further configured to communicate with and upload at least one data file to one wireless access point when the at least one wireless field device is located within the same enterprise location as the one wireless access point, wherein the file transfer management application is further configured to control uploading of the at least one data file to the local data storage server through the at least one wireless access point by determining the enterprise location in which the at least one wireless field device is presently located.

2. The file upload management system of claim 1, further comprising at least one data recording system configured to communicate with and provide the at least one data file to the at least one wireless field device, the at least one data recording system comprising:
   a. a data recording device; and
   b. data storage means.

3. The file upload management system of claim 2, wherein the at least one wireless field device further comprises a wireless field device network adapter and a wireless field device IP address, wherein the at least one data recording system further comprises a data recording system network adapter configured to communicate with and send the at least one data file to the wireless field device network adapter of the at least one wireless field device by using the wireless field device IP address.

4. The file upload management system of claim 2, wherein the at least one data recording system further comprises a recording system verification application associated with a recording system processor, wherein the local data storage server further comprises a server verification application associated with a server processor, wherein the recording system verification application and the server verification application interact to ensure that the at least one data file transferred from the at least one data recording system to the local data storage server is not altered.

5. The file upload management system of claim 1, wherein the file transfer management application is further configured to upload the at least one data file to the local data storage server associated with the enterprise location in which the at least one wireless field device is located.

6. The file upload management system of claim 1, wherein the at least one wireless field device further comprises a wireless field device profile comprising a schedule assigned to the at least one wireless field device; and a preferred data storage server IP address of a preferred data storage server to which to send the at least one data file; wherein the current location information further comprises time and date information; wherein the file transfer management application is further configured to, after identifying the local data storage server associated with the enterprise location,
   a. determine if the local data storage server is the preferred data storage server; and
   b. determine if the schedule of the at least one wireless field device allows the at least one data file to be uploaded to the preferred data storage server if the preferred data storage server is not the same as the local data storage server associated with the enterprise location in which the at least one wireless field device is located.

* * * * *